Figure 1:
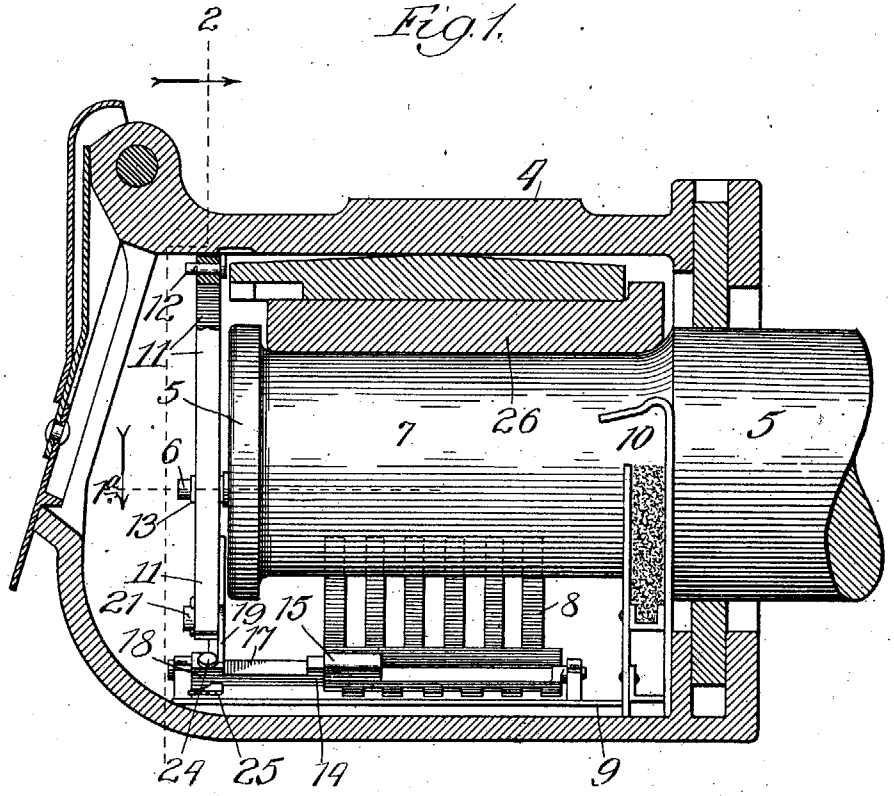
Figure 1A:
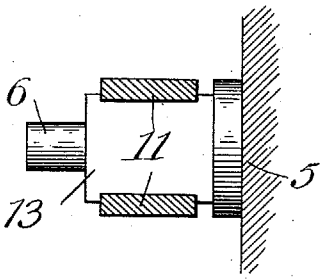

C. B. COON.

JOURNAL BOX LUBRICANT DEVICE.

APPLICATION FILED JAN. 26, 1911.

Reissued Apr. 11, 1911.

13,225.

2 SHEETS—SHEET 1.

Witnesses,
C. E. Gaylord.
G. F. Chase.

Inventor:
Charles B. Coon,
By Dyrenforth, Lee, Christton & Wiles,
Attys.

THE NORRIS PETERS CO., WASHINGTON, D. C.

C. B. COON.

JOURNAL BOX LUBRICANT DEVICE.

APPLICATION FILED JAN. 26, 1911.

Reissued Apr. 11, 1911.

13,225.

2 SHEETS—SHEET 2.

Witnesses:
C. E. Gaylord.
G. F. Chase.

Inventor:
Charles B. Coon,
By Dyrenforth, Lee, Christy & Wiles,
Attys.

THE NORRIS PETERS CO., WASHINGTON, D. C.

UNITED STATES PATENT OFFICE.

CHARLES B. COON, OF EVANSTON, ILLINOIS.

JOURNAL-BOX LUBRICANT DEVICE.

13,225. Specification of Reissued Letters Patent. Reissued Apr. 11, 1911.

Original No. 980,492, dated January 3, 1911, Serial No. 536,488. Application for reissue filed January 26, 1911. Serial No. 604,919.

*To all whom it may concern:*

Be it known that I, CHARLES B. COON, a citizen of the United States, residing at Evanston, in the county of Cook and State of Illinois, have invented a new and useful Improvement in Journal-Box Lubricant Devices, of which the following is a specification.

My present invention is in the nature of an improvement in the invention which forms the subject of Letters Patent of the United States granted to me on the eleventh day of January, 1910, and numbered 946,495; and the improvement may be generally characterized as compensating means, since its object is to prevent wear on the journal-bearing or "brass" from impairing the lubricating action of the oscillating lubricant-carrier by automatically compensating for such wear in a manner to cause the latter to increase, at least approximately in correspondence therewith, the extent of movement of the carrier in the arc it is caused to describe under its eccentric connection with the journal and thus insure its lubricant-applying function thereto.

For the purpose of illustrating this improvement it is shown in the drawings herein as a modification of the mechanism shown and described in my said patent, and involving an oscillating carrier actuated by an eccentric connection with the journal to lift and apply to it lubricant from the supply thereof in the base of the journal-box.

Figure 2:
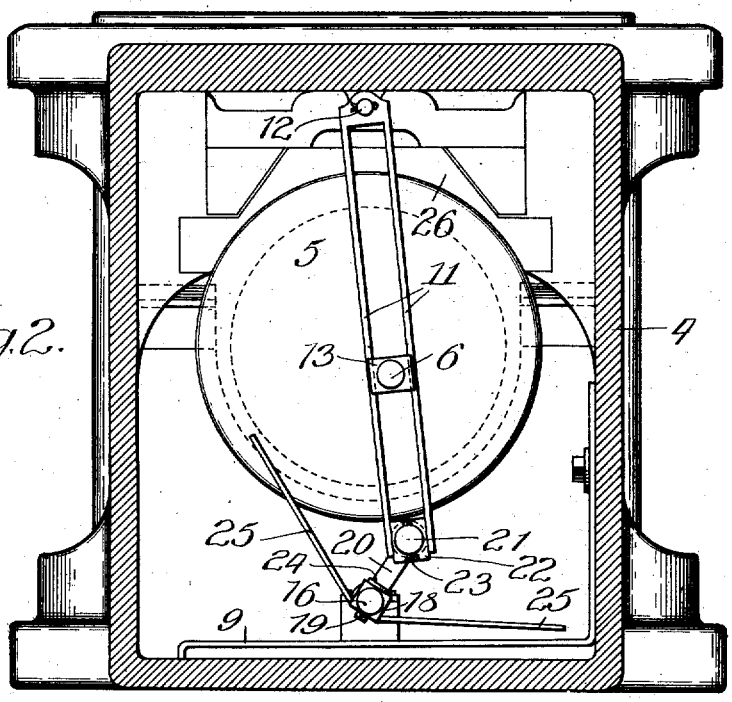
Figure 3:
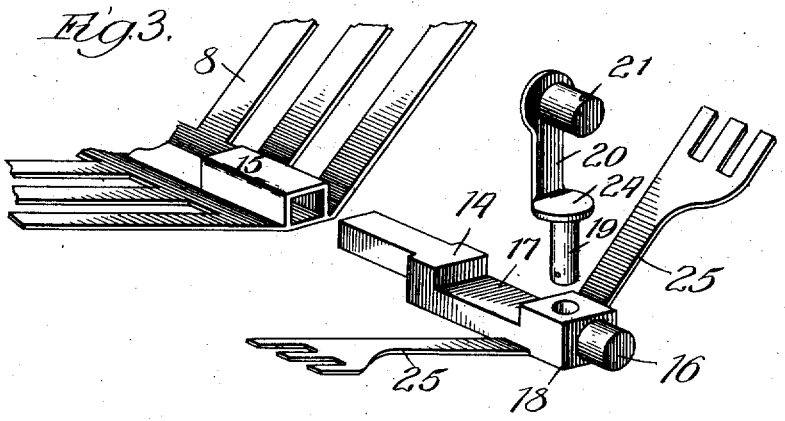

In the accompanying drawings, Figure 1 is a view in vertical longitudinal section of a journal-box containing my improvement; Fig. 1ª is an enlarged section on line 1ª, Fig. 1; Fig. 2 is a section on the irregular line 2, Fig. 1, and Fig. 3 is a perspective view of the carrier and associated parts in unassembled relation.

The journal-box 4, which may involve any desired type, the axle 5 with a stud 6 projecting eccentrically from the end of its journal 7, and the carrier 8 journaled on the chamber-forming false bottom 9 are shown to be the same as the corresponding parts in my aforesaid patent, as is also the lubricant-shield device 10. The position shown of the stud 6 is one of lesser eccentricity to the center of the journal-end than that shown of the stud in said patent.

A bifurcated lever or slot-link 11 is pivotally supported at its upper end, as at 12, to depend from the center of the top of the box 4 and engage a species of washer 13, shown of general H-shape (Fig. 1ª), longitudinally through which the stud 6 passes. The shaft 14 for rocking the carrier, as in the said patent, is connected therewith at a socket 15 on the carrier, into which one end of the shaft is inserted, the opposite end being provided with a trunnion 16 for journaling it, as formerly. The shaft contains between its ends, a depression 17 to increase the space below the flanged end of the journal 7; and the end from which the trunnion 16 projects contains a vertical orifice 18, in which is journaled the lower end of a species of link 19 having an offset section 20. from the upper-end portion of which projects laterally a stud 21 working in a rectangular washer 22, confined in the slot-link 11, as by a cotter 23 passing through the stud, the link 19, which seats at 24 on the shaft, being similarly held against withdrawal from the socket 18.

Carrier-blades 25, 25, of any desired form, but shown forked, extend from opposite sides of the shaft at its outer end, like the blades of the carrier 8, and serve the purpose, under the rocking movements of the shaft, of throwing lubricant from the supply thereof in the box, and in which they work, upon the end of the journal and mechanism of the compensating means, which operates as follows: Rotation of the axle 5, by the eccentric connection of its journal with the shaft 14, rocks the latter and with it the carrier 8, causing the carrier-blades to dip into the lubricant-supply and apply it alternately to the journal from opposite sides, as described in my aforesaid patent; and the blades 25 perform their function in the manner stated. As the journal-brass or bearing 26 wears, unless compensating means were provided, the attendant lowering of the journal-box, with the journal remaining stationary, would, as with the mechanism shown in my said patent, bring the acting point of the eccentric stud higher into the slot-link and thus eventually so decrease the arc of movement of the latter as to render that of the carrier insufficient to convey the lubricant to the journal. By the construction illustrated, however, as the box lowers, under the cause mentioned, the link 11, in lowering with it, changes the positions of attack upon it of the stud 6 to higher points in the link, between the sides or prongs of which the washer is guided for wearing purposes; and thus the arc of movement through which the link actuates the rock-shaft and with it the carrier is increased to compensate for the wear on the bearing.

As will be observed, the axes of the studs 6 and 21 are parallel, so that if the workmanship of the mechanism were accurate the link 19 might be rigid on the rock-shaft; but inasmuch as such accuracy in workmanship may not ordinarily be relied on, the link 19 is rendered yielding, by journaling it in the manner described, to compensate for any inaccuracy of the kind referred to.

My improvement may, without departure from my invention, be embodied differently, in the matter of details of construction, from the embodiment herein shown and described, which, however, is the best form of embodiment now known to me.

What I claim as new and desire to secure by Letters Patent is:—

1. In combination with a journal-box, a journal therein and an interposed brass, a lubricant-carrier movably supported in the box, and carrier-actuating means engaging the journal for automatically increasing the extent of the intermittent movement of the carrier toward and away from the journal under wear on the brass.

2. In combination with a journal-box, a journal therein and an interposed brass, a rocking lubricant-carrier journaled inside the box below the journal and having blades extending from its opposite sides, and carrier-rocking means engaging the journal for automatically increasing the extent of the intermittent movement of the carrier toward and away from the journal under wear on the brass.

3. In combination with a journal-box, a journal therein and an interposed brass, a rock-shaft and a lubricant-carrier connected therewith, both journaled inside the box below the journal and having blades extending from them, and wear-compensating means connecting said carrier eccentrically with the journal to rock said shaft and carrier on their support, for the purpose set forth.

4. In combination with a journal-box, a journal therein and an interposed brass, a lubricant-carrier journaled inside the box below the journal and provided with a rock-shaft, a stud projecting eccentrically from the journal-end, a pivoted slot-link depending from the upper central part of the box and embracing said stud, and a link connected with said shaft and having a stud extending into the slot of said link, for the purpose set forth.

5. In combination with a journal-box, a journal therein and an interposed brass, a rock-shaft and a lubricant-carrier connected therewith, both journaled inside the box below the journal, a stud projecting eccentrically from the journal-end, a pivotal slot-link depending from the upper central part of the box and embracing said stud, and a link journaled in the shaft and having a stud engaging said slot-link below and parallel with that of the eccentric stud, for the purpose set forth.

6. In combination with a journal-box, a journal therein and an interposed brass, a rock-shaft and a lubricant-carrier connected therewith, both journaled inside the box and having blades, a stud projecting eccentrically from the journal-end, a pivotal slot-link depending from the upper central part of the box, slidable blocks in the slot-link with the upper of which said stud engages, and a link pivotally seated in the shaft and provided with a stud engaging the lower of said blocks, for the purpose set forth.

7. A journal-box, a journal therein, and an interposed brass, a movable lubricant-carrier supported in the box, and means whereby the extent of movement of the lubricant-carrier is regulated by the wearing away of the brass.

CHARLES B. COON.

In presence of—
L. HEISLAR,
R. SCHAEFER.

Copies of this patent may be obtained for five cents each, by addressing the "Commissioner of Patents, Washington, D. C."